Sept. 4, 1928.

J. POWELL 1,683,208

PNEUMATIC TIRE

Filed Dec. 17, 1926

INVENTOR.
John Powell,
BY
ATTORNEY.

Patented Sept. 4, 1928.

1,683,208

UNITED STATES PATENT OFFICE.

JOHN POWELL, OF CARLTON, VICTORIA, AUSTRALIA.

PNEUMATIC TIRE.

Application filed December 17, 1926, Serial No. 155,445, and in Australia December 23, 1925.

This invention refers to pneumatic tires for road vehicles and the objects of the improvements are to minimize punctures of the pneumatic tube, to protect the latter against wear and prevent water, dust or gravel entering the tire and to reduce the cost of manufacture.

Briefly stated, the pneumatic tube is contained within a metal casing approximately U-shaped in cross section and fitted with a tread the side of said casing under road shocks telescoping or moving inwardly in a radial direction over the rim of the wheel upon which the tube is seated.

Between the pneumatic tube and the rim there is provided a band of flexible water and dust proof material the side edges of which are adapted to engage with the edges of the casing sides which are suitably bent for the purpose, the object being to prevent water, dust or the like entering between the inner edges of the casing and the rim.

Some practical forms of the invention are illustrated in the accompanying drawings of which, Figure 1, is a cross section through a tire according to one form of the invention.

Figure 1:
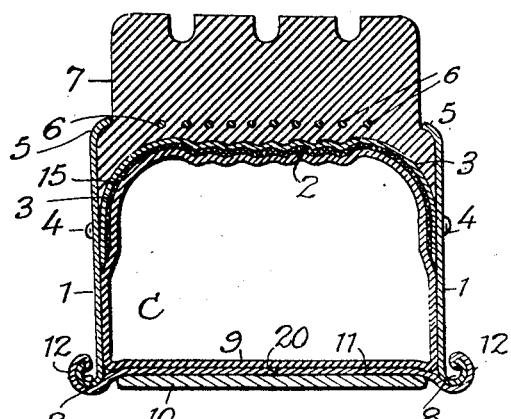
Figure 2:
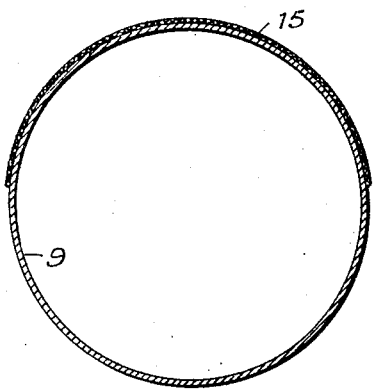
Figure 2, is a cross section through the tube.

According to Figure 1 the approximately U-shaped metal casing C is preferably constructed of two sides 1 and a peripheral strip 2 the edges 3 of which latter are bent inwardly and secured to the casing sides 1 by rivets 4, welding or spot welding while the outer ends 5 of the sides are extended beyond the peripheral strip 2 and curved at their extremities towards each other as illustrated.

The casing is preferably made of steel and the peripheral strip 2 is preferably corrugated for a portion of its width as illustrated for additional strength and the distance between the sides of the casing is greater than the width of the rim 10 of the wheel upon which the tire is fitted.

Around the peripheral strip is wound in several coils a cord or wire 6 or in lieu thereof several rings of cord or wire may be fitted around said strip, the object being to provide a good anchorage for the resilient tread 7 which is vulcanized or moulded on the peripheral strip and about said cord or wire.

In order to enable the tread material to get on the underside of the cord or wire 6, the latter is wound free of the corrugated peripheral strip 2 of the casing.

The tread material also passes under the overhanging curved extremities 5 of the sides of the casing and is thereby further anchored and said tread projects the desired distance beyond said extremities of the casing.

The inner edges 8 of the sides 1 of the casing are curved and between the pneumatic tube 9 and the rim 10 is placed a band 11 of flexible material such as rubber, that is water and dust proof.

The side edges 12 of the band project beyond the sides of the tube and are stretched and sprung into engagement with the curved inner edges 8 of the sides of the casing. Preferably the inner edges of the casing sides are outwardly curved as in Figure 1, and the edges 12 of the flexible band 11 are sprung over same.

Figure 3:
Figure 3 is a fragmentary detail illustrating a modification of a feature in Figure 2.

The projecting side edges 12 of the band may be reinforced with steel wire 13 or wire mesh as illustrated in Figure 3.

Figure 4:
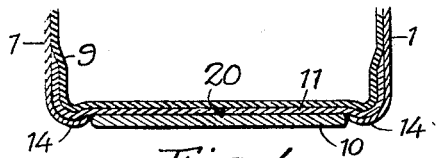
Figures 4 and 5 are fragmentary views illustrating modifications of Figure 1.

If desired the inner edges 14 of the casing sides may be inwardly curved as in Figure 4 in which case the projecting edges 12 of the flexible rubber band are held in engagement with said inwardly curved edges 14 by pressure of the pneumatic tube 9 when fully inflated.

The edges 12 of this band will stretch as the casing telescopes over the rim under road shocks and said band apart from protecting the tube against wear through the rim will prevent water, dust and gravel from entering the casing between its edges and the rim.

The flexible band may be formed of textile material such as canvas or rubberized canvas in which case loose loops 19 of the band project between the curved extremities 14 and the edges of the rim.

Figure 5:
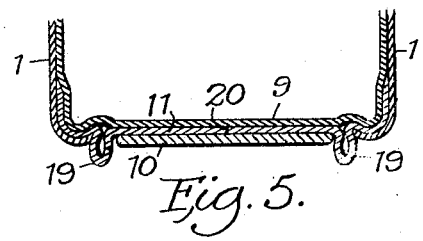

In the construction shown in Figures 1 and 5, the projecting edges of the band will prevent the rim and inner edges of the casing sides contacting.

If preferred the band may be in two strips divided at the point 20 indicated in Figures 1, 4 and 5.

In order to minimize wear of the peripheral side of the tube 9 adjacent the peripheral strip 2 and sides 1 of the casing a protective covering 15 of canvas or other flexible material may be attached to said peripheral side of the tube and extends approximately over one half of the surface of the tube.

I claim:—

1. A pneumatic tire comprising a casing approximately U-shape in cross-section consisting of a peripheral strip having inwardly bent edges fixed to the sides of said casing, said sides extending outward beyond the strip and curved inwardly at their extremities, a tread fitted to said strip and sides, a pneumatic tube within the casing, and a wheel rim slightly narrower than the width of the casing to prevent undue lateral movement thereof and on which said tube is seated.

2. A pneumatic tire comprising a casing approximately U-shape in cross-section consisting of a corrugated peripheral strip having inwardly curved edge portions fixed to the sides of the casing, said sides extending outward beyond the strip and curved inwardly at their outer extremities and curved outwardly at their inner edges, a tire fitted to said strip and the outward extending portion of the sides, a pnuematic tube within said casing, a wheel rim narrower than the width of the casing supporting the tube, and a band of flexible material interposed between the tube and rim having projecting side edges engaging the outwardly curved edges of the sides.

Dated this 18th day of November, 1926.

JOHN POWELL.